(12) United States Patent
Nojima et al.

(10) Patent No.: US 8,125,736 B2
(45) Date of Patent: *Feb. 28, 2012

(54) HEAD SUSPENSION, LOAD BEAM, AND METHOD OF MANUFACTURING LOAD BEAM

(75) Inventors: Akira Nojima, Aikoh-gun (JP); Takashi Horiuchi, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 678 days.

This patent is subject to a terminal disclaimer.

(21) Appl. No.: 12/286,074

(22) Filed: Sep. 26, 2008

(65) Prior Publication Data

US 2009/0091858 A1 Apr. 9, 2009

(30) Foreign Application Priority Data

Oct. 4, 2007 (JP) ................................. 2007-260813

(51) Int. Cl.
*G11B 5/48* (2006.01)
(52) U.S. Cl. .................................. 360/234.7; 360/244.2
(58) Field of Classification Search ............... 360/234.7, 360/244.2
See application file for complete search history.

(56) References Cited

U.S. PATENT DOCUMENTS 5,636,089 A * 6/1997 Jurgenson et al. ......... 360/245.1
(Continued)

FOREIGN PATENT DOCUMENTS

JP 6-330165 11/1994
(Continued)

*Primary Examiner* — Hoai V Ho
(74) *Attorney, Agent, or Firm* — Jordan and Hamburg LLP (57) ABSTRACT

A method of manufacturing a load beam precisely positions a slider on a dimple of a load beam according to precisely obtained positional data of the dimple, the method includes preparing a work which is a flat plate and serves as the load beam, irradiating at least a part of the work where the dimple is formed with a laser beam, to form a modified part at the irradiated part, carrying out plastic working on the modified part, to form the dimple having a concave curved surface at the modified part, taking an image of the concave curved surface of the dimple, obtaining the positional data of the dimple from the image, and positioning the slider on the dimple according to the positional data.

15 Claims, 7 Drawing Sheets

U.S. PATENT DOCUMENTS

| | | | |
|---|---|---|---|
| 5,921,131 A | 7/1999 | Stange | |
| 6,154,952 A * | 12/2000 | Tangren | 29/603.04 |
| 6,246,546 B1 * | 6/2001 | Tangren | 360/245.1 |
| 6,378,195 B1 | 4/2002 | Carlson | |
| 6,556,384 B1 * | 4/2003 | Inoue et al. | 360/245.7 |
| 7,287,315 B2 | 10/2007 | Hayami et al. | |
| 2005/0091834 A1 | 5/2005 | Hayami et al. | |
| 2008/0024928 A1 | 1/2008 | Yang | |
| 2010/0139084 A1 | 6/2010 | Mizuishi | |

FOREIGN PATENT DOCUMENTS

| | | |
|---|---|---|
| JP | 8-161843 | 6/1996 |
| JP | 10-199164 | 7/1998 |
| JP | 11-96709 | 4/1999 |
| JP | 2004-86984 | 3/2004 |
| JP | 2005-209291 | 8/2005 |
| JP | 2006-192536 | 7/2006 |
| WO | WO-00/63890 | 10/2000 |

* cited by examiner

Fig.2(1) Before processing
Fig.2(2) After processing
Fig.2(3) After processing Fig.4(3)
Sectional view of product Fig.4(2)
Just after processing Fig.4(1)
Before processing

HEAD SUSPENSION, LOAD BEAM, AND METHOD OF MANUFACTURING LOAD BEAM

BACKGROUND OF THE INVENTION

1. Field of the Invention

The present invention relates to a head suspension for supporting a slider in a disk drive such as an external storage device of a computer, a load beam which is a part of the head suspension, and a method of manufacturing the load beam.

2. Description of Related Art

Disk drives such as magnetic disk drives and optical disk drives are widely used as external storage devices of computers. Among the disk drives, a magnetic disk drive or a hard disk drive (HDD) has a head suspension for supporting a magnetic head slider (hereinafter simply referred to as "slider").

The head suspension includes a base plate, a load beam, a flexure attached to the load beam, and the like. The load beam supports a gimbal which is a plate spring. A front end of the gimbal forms a tongue serving as a slider mount. To the tongue, the slider is attached with, for example, an adhesive. The slider is slightly pushed with spring force toward the surface of a magnetic disk arranged in the magnetic disk drive.

The periphery of the tongue at the front end of the gimbal is mostly cut from the body of the gimbal. The slider on the tongue is supported with a dimple formed at a front end of the load beam. The dimple has a convex curved surface to support the back side of the slider. A barycenter of the slider adhered to the tongue is aligned on the dimple.

When the magnetic disk is rotated, a fluid dynamic pressure effect occurs to slightly float the slider from the surface of the magnetic disk against load applied to the slider by the load beam. At this time, the dimple functions as a fulcrum to freely change the attitude of the slider in tangential and normal directions relative to a track of the magnetic disk.

As mentioned above, the slider opposes the dimple with the tongue interposing between them. To properly control the attitude of the slider, it is very important to position the barycenter of the slider just on a vertex of the dimple.

From the front side of the tongue where the slider is mounted, the dimple is invisible because the dimple is arranged on the back side of the tongue. This positional relationship between the slider and the dimple prevents the precise positioning of the slider onto the dimple because the positions of the slider and dimple are not visually confirmable.

Figure 7:
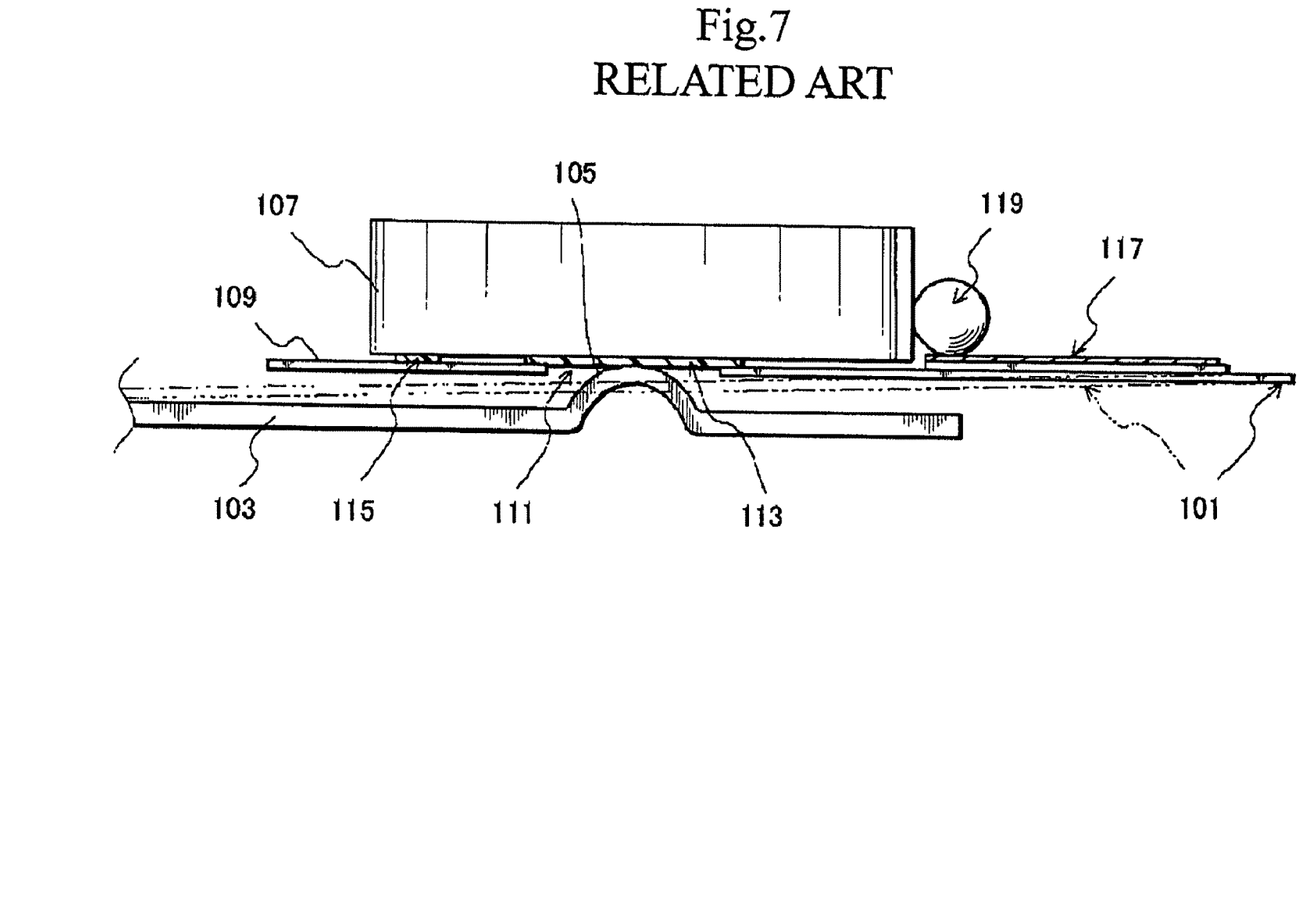
FIG. 7 is a sectional side view showing a slider at a front end of a load beam according to a related art.

To solve this problem, Japanese Unexamined Patent Application Publication No. 2004-86984 discloses a technique shown in FIG. 7. This related art is a magnetic head assembly for a magnetic disk drive, capable of accurately positioning a slider. In FIG. 7, the magnetic head assembly has a gimbal 101 at a front end of the assembly. The gimbal 101 has an opening 111. The opening 111 is formed in a tongue 109 of the gimbal 101 at a position corresponding to a barycenter of a slider 107 and a dimple 105 formed at a front end of a load beam 103. The opening 111 is closed with a sheet 113 that is optically transparent and is adhered to the tongue 109. Between the tongue 109 and the periphery of the slider 107, there is interposed an attitude correcting sheet 115 to keep the slider 107 parallel to the surface of the tongue 109. On the gimbal 101, a wiring pattern 117 is formed. The wiring pattern 117 is electrically connected to an electrode pad (not shown) of the slider 107 through a GBB 119 which is a kind of ultrasonic bonding.

According to this related art, the opening 111 and sheet 113 allow the dimple 105 arranged on the back side of the tongue 109 to be visible from the front side of the tongue 109. As a result, the slider 107 can precisely be positioned with respect to the dimple 105, to improve a data accessing ability of the magnetic head assembly.

The related art, however, involves a complicated structure.

SUMMARY OF THE INVENTION

An object of the present invention is to provide a technique capable of precisely positioning a slider with respect to a dimple without a complicated structure.

In order to accomplish the object, an aspect of the present invention provides a method of manufacturing a load beam, including preparing a work which is a flat plate and serves as a load beam, irradiating a part of the work where a dimple is formed with a laser beam to form a modified part at the irradiated part, and carrying out plastic working on the modified part to form the dimple having a concave curved surface at the modified part.

This aspect forms the concave curved surface of the dimple from the modified part irradiated with a laser beam. The concave curved surface of the dimple, therefore, has low surface roughness and uniform smoothness.

According to another aspect of the present invention, the modified part is formed by melting and softening the part of the work with the laser beam and the plastic working includes forging and pressing the melted and softened part.

This aspect surely lowers surface roughness of the concave curved surface of the dimple and makes the concave curved surface uniform.

A still another aspect of the present invention takes an image of the concave curved surface of the dimple, obtains positional data of the dimple from the image, and according to the positional data, positions and supports a slider with respect to the dimple.

This aspect accurately obtains positional data for the concave curved surface of the dimple and accurately positions the slider without a complicated structure.

Still another aspect of the present invention provides a load beam having a flat plate body, a dimple formed on the body, a continuous surface extending over a surface of the body and a concave curved surface of the dimple, and a modified part extending from the concave curved surface of the dimple toward the inside thereof. The concave curved surface of the dimple is a smooth surface formed by carrying out plastic working on the modified part and having lower surface roughness than the surface of the body on the continuous surface.

According to this aspect, the concave curved surface of the dimple has low surface roughness, and therefore, a slider can precisely be positioned on the dimple without a complicated structure.

Still another aspect of the present invention provides a head suspension having the load beam of any one of the above-mentioned aspects.

According to this aspect, the head suspension includes the precisely positioned slider, and therefore, can properly control the attitude of the slider.

BRIEF DESCRIPTION OF THE DRAWINGS

FIGS. 1(1), 1(2), and 1(3) are plan, side, and back views showing a head suspension according to an embodiment of the present invention;

FIG. 2(1) is a plan view showing a load beam before carrying out plastic working according to an embodiment of the present invention;

FIG. 2(2) is a plan view showing the load beam of FIG. 2(1) after the plastic working;

FIG. 2(3) is a side view showing the load beam of FIG. 2(2);

FIGS. 4(1), 4(2), and 4(3) are views showing a process of forming a dimple with a metal mold;

FIG. 5(1) is a view showing an image of a concave curved surface of a dimple formed without laser irradiation according to a comparative example;

FIG. 5(2) is a view showing an image of a concave curved surface of a dimple formed after laser irradiation according to an embodiment of the present invention;

FIG. 6(1) is a view showing an image of a concave curved surface of a dimple from which positional data is obtained according to an embodiment of the present invention;

FIG. 6(2) is a view showing a bottom point extracted from the image of FIG. 6(1)

DETAILED DESCRIPTION OF EMBODIMENTS

A head suspension, a load beam, and a method of manufacturing a load beam according to an embodiment of the present invention will be explained in detail with reference to the drawings.

First, a head suspension having a load beam according to an embodiment of the present invention will be explained. In the following explanation, a "work" implicates any material to be processed, including a semifinished or half-finished product.

FIGS. 1(1), 1(2), and 1(3) are plan, side, and back views showing the head suspension according to an embodiment of the present invention.

The head suspension 11 has a load beam 13, a base plate 15, a flexure 17, and other elements.

The load beam 13 is produced according to a manufacturing method explained later. The load beam 13 is made of a precision thin plate spring and functions to apply load onto a slider (explained later). Material for the load beam 13 is preferably a metal plate made of austenite-based stainless steel such as SUS304 or SUS305 (Japanese Industrial Standard). For example, the SUS304 contains 0.08% or lower C, 1% or lower Si, 2% or lower Mn, 0.04% or lower P, 0.03% or lower S, 8% to 10.5% Ni, 18% to 20% Cr, and the rest Fe. The thickness of the load beam 13 is in the range of several tens of micrometers to about 100 μm.

The load beam 13 has a base 13a that is fixed to the base plate 15 by, for example, laser welding at welding spots 14. The base plate 15 has a pair of springs 15a (FIG. 1(3)) made of a resilient thin stainless steel rolled plate. The springs 15a support the load beam 13. The base plate 15 has a boss 16, which is attached to a carriage arm (not shown) to pivot the base plate 15 around an axis. The base plate 15 may be integral with an arm that is attached to a carriage. When the base plate 15 is pivoted, the head suspension 11 moves in a transverse direction of a disk arranged in a hard disk drive in which the head suspension 11 is installed, to position the slider onto a target track of the disk.

The flexure 17 is made of a conductive thin metal plate such as a resilient thin stainless steel rolled plate and has a thickness of about 20 μm. The flexure 17 is fixed to the load beam 13 by, for example, laser welding. The flexure 17 has an insulating layer on which a wiring pattern (not shown) is formed.

The flexure 17 has a slider mount 19. The slider mount 19 has a read/write terminal 19a. The terminal 19a is electrically connected to one end of the wiring pattern of the flexure 17. The other end of the wiring pattern of the flexure 17 extends toward the base plate 15.

The slider mount 19 supports the slider (not shown) that incorporates a transducer. The slider is arranged to face a track of the disk (not shown).

When the disk is turned at high speed, the slider slightly floats from the surface of the disk to form an air bearing between the disk and the slider, as is known in the art.

The load beam 13 will be explained in detail.

Figure 1:
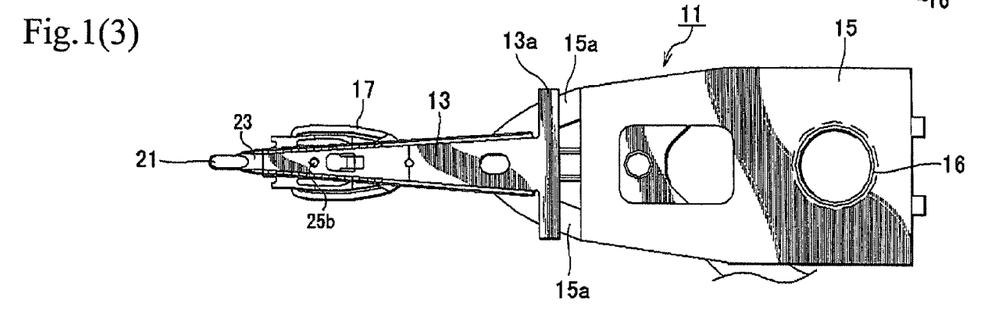
Figure 2:
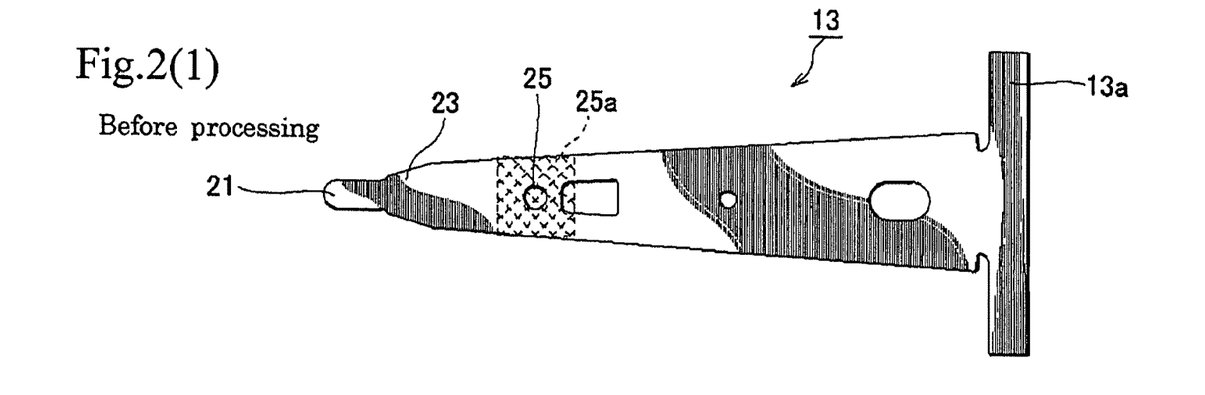
Figure 3:
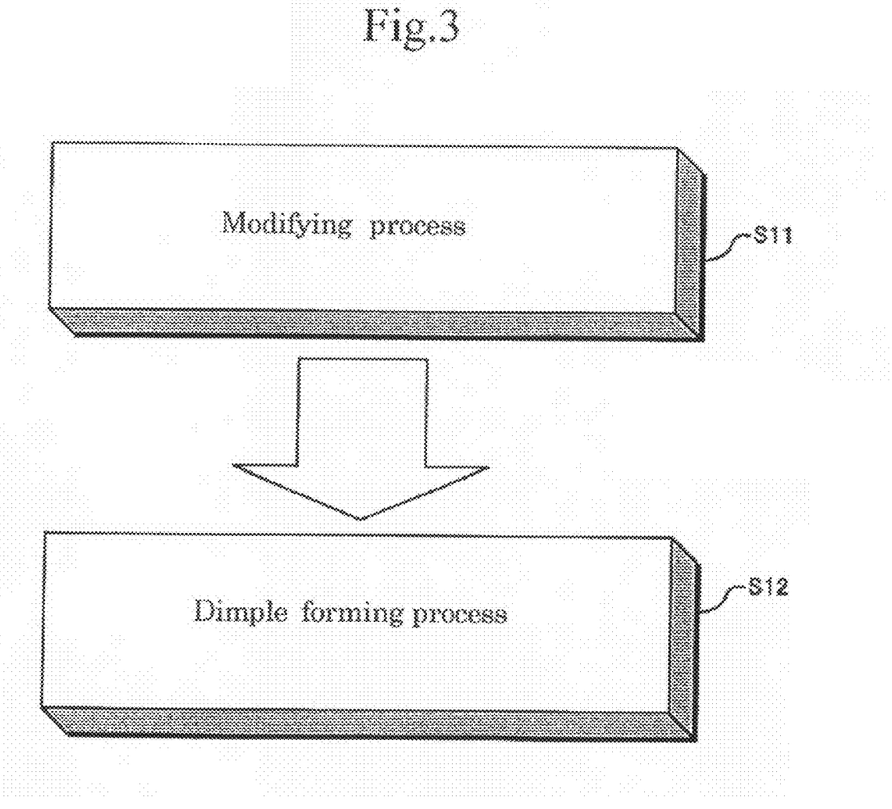
FIG. 3 is a view showing a method of manufacturing a load beam according to an embodiment of the present invention.
Figure 4:
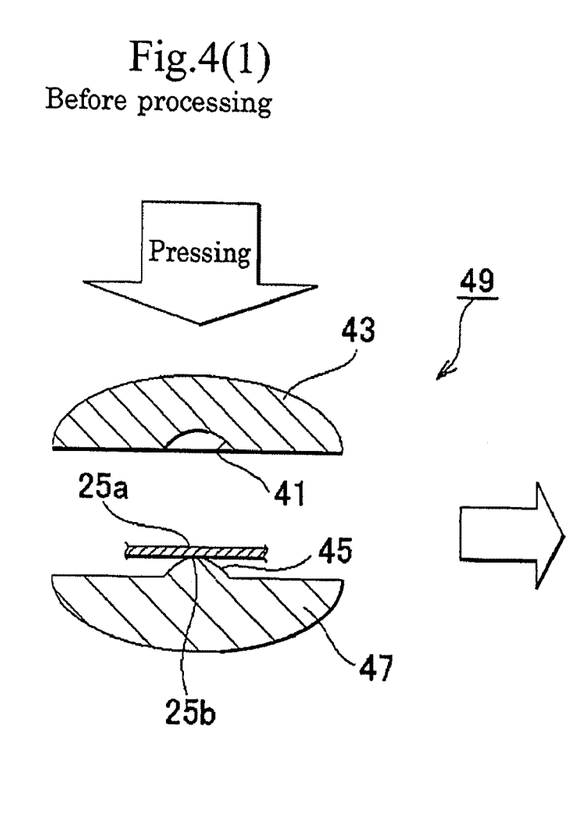
Figure 5:
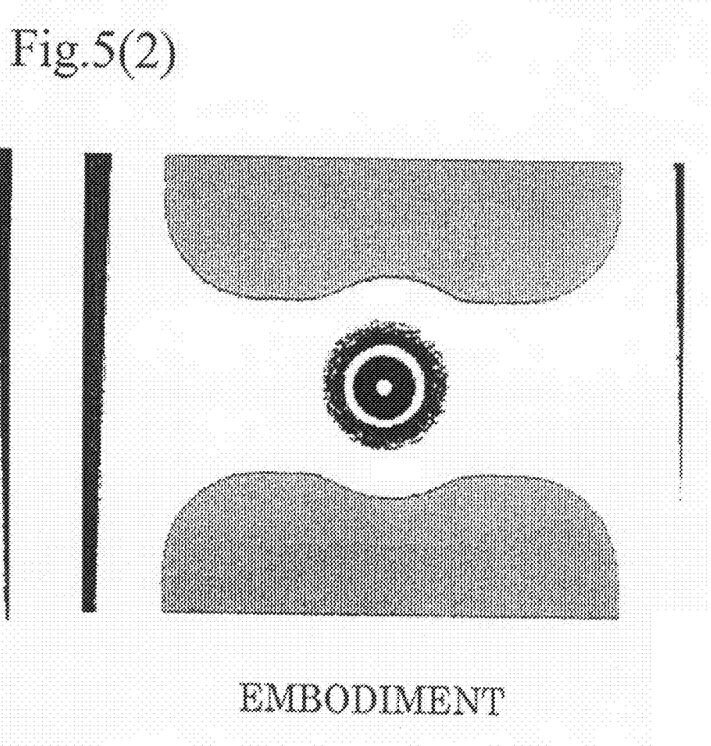
Figure 6:
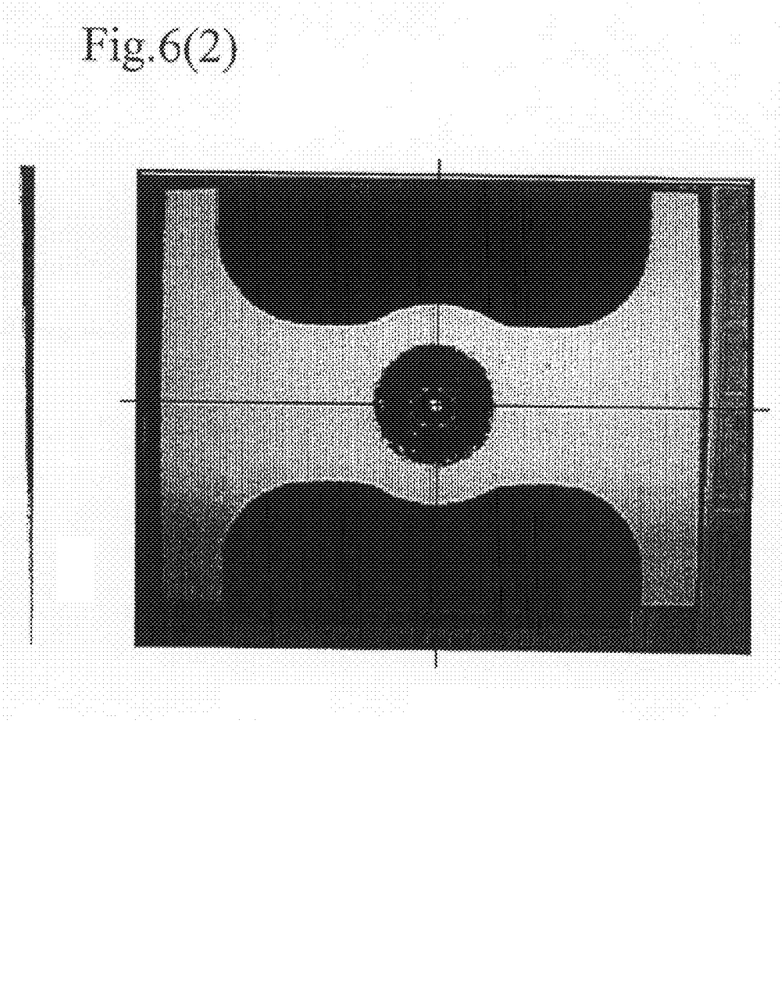

FIG. 2(1) is a plan view showing the load beam 13 before carrying out plastic working, FIG. 2(2) is a plan view showing the load beam 13 after carrying out the plastic working, and FIG. 2(3) is a side view showing the load beam 13 of FIG. 2(2). FIG. 3 is a view showing a method of manufacturing the load beam 13 according to an embodiment of the present invention.

The load beam 13 has bent edges 27 extending in a longitudinal direction. A front end of the load beam 13 has an integral tab 21 used when loading/unloading the head suspension 11.

The tab 21 has a tongue shape outwardly extending from the front end of the load beam 13. The tab 21 has an inner concave curved surface and an outer convex curved surface. Between the tab 21 and the front end of the load beam 13, there is a slope 23. The slope 23 is slanted by a predetermined angle such that the front end of the slope 23 is away from the disk. The slope 23 is reinforced with the bent edges 27 extending along the load beam 13. The base of the tab 21 is supported and reinforced with the slope 23.

When loading/unloading the head suspension 11 onto or out of the disk in the hard disk drive, the tab 21 is guided along a guide or a ramp block (not shown) in the hard disk drive. The ramp block has a ramp guide surface and is generally arranged in the vicinity of the disk. For example, when the disk is stopped, the tab 21 is moved onto the ramp block along which the tab 21 slides to retract through the ramp guide surface. With the ramp block, the slider of the head suspension 11 can move into a retract zone defined at a side of the disk and be away from the disk. The ramp block is made of synthetic resin.

The load beam 13 has a dimple 25 formed in a front end area of the load beam 13. The dimple 25 protrudes from a first surface (top surface) of the body of the load beam 13 and has an inner concave curved surface and an outer convex curved surface. The location of the dimple 25 on the load beam 13 corresponds to the location of the slider mount 19 of the flexure 17. The convex curved surface of the dimple 25 supports the slider so that the slider may roll and pitch.

The concave curved surface 25b of the dimple 25 forms single continuous surface together with a second surface (bottom surface) of the body of the load beam 13. The dimple 25 has a modified (reformed) layer or part extending from the concave curved surface 25b toward the inside thereof. The concave curved surface 25b is formed by carrying out plastic working on the modified part as explained later, so that the concave curved surface 25b is uniformly smooth and has lower surface roughness than the second surface of the load beam 13 on the continuous surface.

A method of manufacturing the load beam 13 according to an embodiment of the present invention will be explained.

The method includes a modifying process of step S11 and a dimple forming process of step S12 (FIG. 3). The steps S11 and S12 are sequentially carried out.

The modifying process of step S11 prepares a flat plate as a work and irradiates at least the back surface of a part of the work where the dimple 25 is formed with a laser beam, to form a modified part at the irradiated part.

In practice, the flat plate prepared as a work may contain a plurality of shaped or unshaped parts that are chained and are processed into load beams. In the case of shaped parts, the flat plate may be formed from, for example, a rectangular flat metal plate by etching. Naturally, the flat plate prepared as a work may contain a single shaped or unshaped part to be processed into a load beam.

In FIG. 2(1), a hatched part 25a is a part where the dimple 25 is formed and includes a surface where the concave curved surface is formed and the periphery thereof. The part 25a is irradiated with a laser beam in the modifying process of step S11. In the modifying process of step S11, the part 25a is rapidly heated or solidified, to form a modified layer in the back surface of the part 25a. The modifying process modifies the state of the partial surface of the work before forming the dimple 25 on the work by pressing. At this time, a part of the first surface (top surface) of the work where the convex curved surface of the dimple 25 is formed may also be irradiated with a laser beam.

The opposite surface of the laser-irradiated part 25a may be also irradiated with a laser beam. The opposite surface includes a surface where the convex curved surface is formed and the periphery thereof.

The laser-irradiated area is set to extend around a spot where the dimple 25 is formed as mentioned-above. This is to secure that the modified part surely covers the spot where the dimple 25 is formed.

Laser beam irradiating conditions are determined according to the material of the work. Before achieving the method of the embodiment, laser beam irradiating conditions must be determined properly according to the material of the work in order to properly modify or reform the partial surface of the work. An emitter for emitting a laser beam may be selected from a semiconductor laser, a YAG laser, and a carbon dioxide laser.

The modifying process of step S11 produces a semifinished load beam having the modified part. After the modifying process, the dimple forming process of step S12 is carried out.

The dimple forming process of step S12 carries out three-dimensional plastic working on the modified part, to form the dimple 25 having the inner concave curved surface and outer convex curved surface. The plastic working is, for example, cold forging and cold pressing with a metal mold, to produce the load beam having the dimple 25.

The dimple forming process of step S12 also forms the slope 23, the bent edges 27, and the like. If the work is not shaped into the load beam, cutting is carried out at the time of forming the dimple 25, to cut the work into the shape of the load beam. The cutting and the dimple forming can be carried out in a single step, to reduce the number of load beam manufacturing steps. This results in simplifying process management and reducing costs.

FIGS. 4(1) to 4(3) show a process of forming the dimple 25 with the use of a metal mold 49. The metal mold 49 includes a punch 43 and a stationary die 47. The punch 43 has a recess 41 that is smooth and has a semispherical shape. The die 47 has a protrusion 45 that is smooth and has a semispherical shape.

In FIG. 4(1), the semifinished load beam having the modified part is set at a predetermined position in the metal mold 49. The semifinished load beam in this case includes a flat plate prepared as a work that is a metal sheet such as a stainless steel rolled sheet. In addition, the semifinished load beam also includes a flat plate prepared as a work having a plurality of shaped parts that are chained and are processed into load beams by, for example, etching. Each semifinished load beam is reformed or modified by irradiating a laser beam on the back surface of the part 25a.

In FIG. 4(2), the punch 43 is descended onto the semifinished load beam set on the die 47 and is pressed to the semifinished load beam at a predetermined pressure. The load beam is pressed in a thickness direction, to form the dimple 25 (FIG. 4(3)) having a semicircular shape provided with the inner concave curved surface and outer convex curved surface. At this time, the concave curved surface 25b of the dimple 25 has a dense fine metal structure and is smooth. Namely, the dimple 25 is provided with the concave curved surface 25b having proper surface roughness and uniform smoothness.

Next, a method of mounting a slider on the above-mentioned load beam according to an embodiment of the present invention will be explained.

The method includes a positional data obtaining process and a slider setting process.

The positional data obtaining process takes an image of the concave curved surface 25b of the dimple 25 with an image pickup device such as a CCD camera and obtains positional data for the dimple 25 from the image according to image data processing. In the obtainment of the positional data, the concave curved surface 25b of the dimple 25 is positioned on the back side opposite to the convex curved surface that is in contact with the slider side, so that positional data including data related to the bottom point of the concave curved surface 25b is certainly obtained.

The image data processing is carried out with, for example, an image data processor and binarizes the image and extracts a bottom point of the concave curved surface 25b of the dimple 25. At this time, the concave curved surface 25b of the dimple 25 has proper surface roughness and uniform smoothness as mentioned above. Accordingly, positional data including data related to the bottom point of the concave curved surface 25b is precisely obtained. After completing the positional data obtaining process, the slider setting process is carried out.

Before at least the slider setting process, the flexure 17 is attached to the load beam 13.

According to the obtained positional data for the dimple 25, the slider setting process positions a slider on the dimple 25 so that the slider is supported on the dimple 25. More precisely, the slider setting process aligns a barycenter of the slider on a vertex of the dimple 25, and in this state, fixes the slider to the slider mount 19 of the flexure 17 with, for example, an adhesive.

In this way, the method takes an image of the concave curved surface 25b, which has proper surface roughness and uniform smoothness, of the dimple 25, obtains precise positional data for the dimple 25 from the image, and positions a slider with respect to the dimple 25 according to the positional data.

Without a complicated structure, the method can precisely position a slider on the dimple 25.

Images of the back surfaces (concave curved surfaces) of dimples taken with a CCD camera (not shown) will be explained.

FIG. 5(1) is an image of the concave curved surface of a dimple formed according to a comparative example that carries out no laser beam irradiation. FIG. 5(2) is an image of the concave curved surface of a dimple formed according to the above-mentioned embodiment that carries out laser beam irradiation (fixed focus) and then forms the dimple at the laser-irradiated part.

As is apparent from comparison between the images of FIGS. 5(1) and 5(2), a bottom point of the concave curved surface 25b of the dimple 25 according to the embodiment is brighter than that of the comparative example. In addition, a brightness difference between the bottom point and the periphery thereof according to the embodiment is more conspicuous than that of the comparative example. Also, a flat area around the dimple 25 according to the embodiment is brighter than that of the comparative example.

According to the embodiment, the bottom point of the concave curved surface 25b of the dimple 25 is sharp and easily distinguishable from the periphery thereof, and therefore, is easily binarized to extract the location thereof as shown in FIG. 6(2). Consequently, the embodiment can easily and precisely obtain positional data for the dimple 25, and according to the positional data, can precisely position a slider on the dimple 25.

Effect of the present invention will be summarized.

The load beam manufacturing method includes the modifying process of step S11 and the dimple forming process of step S12. The modifying process of step S11 prepares a flat plate as a work and irradiates the back surface of a part of the work where the dimple 25 is formed with a laser beam, to form a modified part at the irradiated part. The dimple forming process of step S12 carries out three-dimensional plastic working on the modified part, to form the dimple 25 having the concave curved surface 25b on the load beam 13.

The concave curved surface 25b of the dimple 25 on the load beam 13 has reduced surface roughness and uniform smoothness. The method of this embodiment directly improves the surface finishing accuracy of the dimple 25.

The manufacturing method includes the positional data obtaining process and the slider setting process. The positional data obtaining process takes an image of the concave curved surface 25b of the dimple 25 and obtains positional data for the dimple 25 from the image. According to the positional data, the slider setting process positions and supports a slider on the dimple 25.

Namely, this method takes an image of the concave curved surface 25b, which has proper surface roughness and uniform smoothness, obtains precise positional data of the dimple 25 from the image, and positions a slider on the dimple 25 according to the positional data.

This embodiment can obtain precise positional data for the concave curved surface 25b of the dimple 25, and according to the positional data, can precisely position a slider on the dimple 25 without a complicated structure.

The concave curved surface 25b of the dimple 25 has reduced surface roughness and uniform smoothness, and therefore, the brightness of a bottom point of the concave curved surface 25b is conspicuous compared with the brightness of the periphery thereof. An image of the bottom point, therefore, is easily binarized to provide precise positional data for the bottom point. With the precise positional data of the bottom point, a slider can precisely be positioned just on the dimple 25.

Recent image recognition technology enables one to take an image of a dimple with a camera, obtain positional data of the dimple from the image, and position a slider on the dimple according to the positional data of the dimple.

In connection with this, an important issue is how precisely the positional data for the dimple is obtained from the image.

Contrary to the idea of the present invention, there is an idea of carrying out plastic working to three-dimensionally form a dimple on a work, and then, irradiating a surface of the dimple with a laser beam to modify the irradiated part.

In this case, a laser beam distance, i.e., a distance from an emission point of the laser beam to an incident point of the laser beam on the surface of the work varies depending on the location of the incident point on the work.

Generally, a laser beam emitter involves a just focus mode and a defocus mode. Irrespective of these modes, the energy density of a laser beam is kept within a predetermined range if the laser beam distance is kept within a predetermined range, to substantially provide a uniform surface modifying effect. If the laser beam distance is out of the predetermined range, the energy density of a laser beam fluctuates to vary the surface modifying effect.

To uniformly modify a three-dimensional surface under such an energy fluctuating state, a control system must be employed to maintain the laser beam distance within a predetermined range. Such a control system complicates the laser beam emission system and increases the cost thereof. Even if a laser beam is controlled to keep a predetermined laser beam distance, it is very difficult to uniformly modify a three-dimensional surface.

On the other hand, the present invention irradiates a flat plate serving as a work with a laser beam, to modify an irradiated part of the work. Without complicated distance control, the present invention can uniformly modify a part of the surface of a work irradiated with a laser beam. Thereafter, the present invention three-dimensionally processes the modified part of the work into a dimple (25) having a concave curved surface (25b).

Compared with the idea of three-dimensionally processing a work to form a dimple on the work and then irradiating the work with a laser beam, the present invention can directly improve the surface finishing accuracy of the concave curved surface (25b) of the dimple (25).

According to the load beam manufacturing method of the embodiment, the modifying process of step S11 irradiates a part of a flat plate work where the dimple 25 is formed with a laser beam, to modify (melt and soften) the irradiated part. Thereafter, the dimple forming process of step S12 forges and presses the modified part that has been melted and softened, to form the dimple 25.

The forging and pressing onto the modified part form a dense fine metal structure in the modified part and smooth the surface of the modified part. As a result, the dimple 25 has reduced surface roughness and uniform smoothness and the concave curved surface 25b is uniformly smooth.

To elongate the service life of a press metal mold, a pressure applied to the press metal mold must be low. On the other hand, to uniformly smooth the surface of a work by pressing, a pressure applied to the press metal mold must be high. Namely, elongating the service life of a press metal mold and uniformly smoothing the surface of a work with the press metal mold are tradeoffs.

For this, the load beam manufacturing method of the embodiment presses a modified part that has been melted and softened with a laser beam. Compared with pressing an unmodified part, pressing a modified part according to the embodiment can employ a lower pressing pressure to uniformly smooth the surface of the modified part. Namely, the embodiment can uniformly smooth the surface of a work, and at the same time, can elongate the service life of a press metal mold.

According to the comparative example that three-dimensionally presses a work to form a dimple, and thereafter, irradiates the work with a laser beam, heat of the laser beam will easily deform the dimple. If such deformation exceeds an acceptable level, a correcting process is needed to correct the deformation.

According to the load beam manufacturing method of the embodiment, the pressing work in the dimple forming process of step S12 can correct such deformation, if any. Namely, the embodiment needs no additional correcting process for correcting such deformation.

The load beam 13 produced according to the manufacturing method of the embodiment has the dimple 25 whose smooth concave curved surface 25b on the single continuous surface has lower surface roughness than the surface of the body of the load beam 13 on the single continuous surface.

With the concave curved surface 25b having reduced surface roughness, a slider can precisely be positioned on the dimple 25 of the load beam 13 without a complicated structure.

With such a load beam 13 having the precisely positioned slider, the head suspension 11 can properly control the attitude of the slider.

The present invention is not limited to the embodiments mentioned above. Without departing from the scope and spirit of the present invention stipulated in the specification and appended claims, the present invention allows a variety of modifications. It should be understood that the present invention covers head suspensions, load beams, and load beam manufacturing methods that occur from such modifications.

What is claimed is:

1. A method of manufacturing a load beam, the load beam being configured to be pivotally supported in a read/write device and having a dimple, the dimple having an inner concave curved surface and an outer convex curved surface to position and support a slider, the slider receiving load applied by the load beam and being configured to write/read data to and from a disk arranged in the read/write device, the method comprising:

preparing a work which is a flat plate and serves as the load beam and irradiating at least a part of the work where the dimple is formed with a laser beam, thereby forming a modified part at the irradiated part; and carrying out plastic working on the modified part, after said irradiating, thereby forming the dimple having the concave curved surface at the modified part and finishing the modified part, which has been modified by said irradiating and said carrying out plastic working, to form the convex curved surface of the dimple having a bottom from the finished modified part.

2. The method of claim 1, wherein:

irradiating a part of the work with a laser beam includes melting and softening the part with the laser beam, to form the modified part; and the plastic working includes forging and pressing the modified part that has been melted and softened.

3. The method of claim 1, further comprising:

taking an image of the concave curved surface of the dimple and obtaining positional data for the dimple from the image; and positioning the slider on the dimple according to the obtained positional data.

4. The method of claim 2, further comprising:

taking an image of the concave curved surface of the dimple and obtaining positional data for the dimple from the image; and positioning the slider on the dimple according to the obtained positional data.

5. A load beam manufactured according to the method of claim 1.

6. A load beam manufactured according to the method of claim 2.

7. A load beam manufactured according to the method of claim 3.

8. A load beam manufactured according to the method of claim 4.

9. A load beam configured to be pivotally supported in a read/write device and having a dimple, the dimple having an inner concave curved surface and an outer convex curved surface to position and support a slider, the slider receiving load applied by the load beam and being configured to write/read data to and from a disk arranged in the read/write device, the load beam comprising:

a flat plate body on which the dimple is formed;

a continuous surface extending over a surface of the body and the concave curved surface of the dimple; and a modified part extending from the concave curved surface of the dimple including a bottom toward the inside thereof; and wherein the concave curved surface of the dimple is a smooth surface formed by irradiating a part of the load beam to be shaped into the concave curved surface of the dimple with a laser beam, and carrying out plastic working on the irradiated part, so that the concave curved surface has lower surface roughness than the surface of the body on the continuous surface.

10. A head suspension comprising the load beam of claim 5.

11. A head suspension comprising the load beam of claim 6.

12. A head suspension comprising the load beam of claim 7.

13. A head suspension comprising the load beam of claim 8.

14. A head suspension comprising the load beam of claim 9.

15. A method of manufacturing a load beam, the load beam being configured to be pivotally supported in a read/write device and having a dimple, the dimple having an inner concave curved surface and an outer convex curved surface to position and support a slider, the slider receiving load applied by the load beam and being configured to write/read data to and from a disk arranged in the read/write device, the method comprising:

preparing a flat plate body to serve as the load beam, the flat plate body having a continuous surface;

irradiating at least a part of the continuous surface of the flat plate body, including a first portion, with a laser beam, thereby modifying surface properties of said first portion;

after said irradiating, plastically deforming said first portion by pressing to form said inner concave curved surface and said outer convex curved surface of said dimple; and after said plastically deforming, finishing at least the concave curved surface of the dimple to have a lower surface roughness than a non-irradiated portion of the continuous surface.

* * * * *